US008959223B2

(12) United States Patent
Sloma et al.

(10) Patent No.: US 8,959,223 B2
(45) Date of Patent: Feb. 17, 2015

(54) AUTOMATED HIGH RESILIENCY SYSTEM POOL

(75) Inventors: Andrew J. Sloma, New Braunfels, TX (US); Jonathan L. Triebenbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/248,108

(22) Filed: Sep. 29, 2011

(65) Prior Publication Data

US 2013/0086268 A1   Apr. 4, 2013

(51) Int. Cl.
  *G06F 15/16*  (2006.01)
  *G06F 9/455*  (2006.01)
  *G06F 9/50*  (2006.01)

(52) U.S. Cl.
  CPC . *G06F 9/455* (2013.01); *G06F 9/50* (2013.01)
  USPC ........................... 709/226; 709/220; 709/224

(58) Field of Classification Search
  USPC ................................ 709/203, 223, 224, 226
  See application file for complete search history.

(56) References Cited

U.S. PATENT DOCUMENTS

| | | | |
|---|---|---|---|
| 6,598,097 B1 | 7/2003 | Daniels et al. | |
| 7,050,807 B1* | 5/2006 | Osborn | 455/445 |
| 7,552,438 B1 | 6/2009 | Werme et al. | |
| 7,577,813 B2 | 8/2009 | Nijhawan et al. | |
| 2004/0024870 A1* | 2/2004 | Hirata et al. | 709/224 |
| 2004/0249743 A1* | 12/2004 | Virginas et al. | 705/37 |
| 2005/0278493 A1* | 12/2005 | Lin et al. | 711/162 |
| 2006/0129899 A1* | 6/2006 | Cochran et al. | 714/718 |
| 2007/0098014 A1* | 5/2007 | Pomaranski et al. | 370/468 |
| 2009/0182865 A1* | 7/2009 | Karpuram | 709/224 |
| 2009/0248937 A1 | 10/2009 | Solomon et al. | |
| 2009/0276773 A1 | 11/2009 | Brown et al. | |
| 2009/0313391 A1 | 12/2009 | Watanabe | |
| 2010/0014526 A1 | 1/2010 | Chavan et al. | |
| 2010/0019576 A1* | 1/2010 | Buterbaugh et al. | 307/53 |
| 2010/0082874 A1 | 4/2010 | Baba et al. | |
| 2010/0095310 A1 | 4/2010 | Oshins | |
| 2010/0180274 A1 | 7/2010 | Cherian et al. | |
| 2010/0299674 A1* | 11/2010 | Wang et al. | 718/104 |
| 2011/0047271 A1* | 2/2011 | Guibe et al. | 709/226 |
| 2011/0090751 A1* | 4/2011 | Manna et al. | 365/200 |
| 2011/0106950 A1* | 5/2011 | Schlack | 709/226 |
| 2011/0179319 A1* | 7/2011 | Parker et al. | 714/710 |

(Continued)

OTHER PUBLICATIONS

U.S. Appl. No. 13/248,101 entitled, "Automated Workload Performance and Availability Optimization Based on Hardware Affinity" filed Sep. 29, 2011 by Andrew J. Sloma et al.

(Continued)

*Primary Examiner* — Barbara Burgess
(74) *Attorney, Agent, or Firm* — Wood, Herron & Evans, LLP

(57) ABSTRACT

A method, apparatus, and program product build a high resiliency system pool in a computing system by analyzing hardware resources configured on a plurality of computing nodes in the computing system. The plurality of computing nodes in the computing system are analyzed to determine whether redundant hardware resources are configured thereon, an identifier associated with the computing node is adjusted in response to the determined redundant hardware resources configured thereon, and the computing nodes are added to a high resiliency virtual system pool for use by the system in assigning tasks to perform, in monitoring system health, in monitoring hardware resource events.

22 Claims, 9 Drawing Sheets

(56) References Cited

U.S. PATENT DOCUMENTS

| | | | |
|---|---|---|---|
| 2012/0030318 A1* | 2/2012 | Ryder | 709/220 |
| 2012/0030343 A1* | 2/2012 | Ryder | 709/224 |
| 2012/0066390 A1* | 3/2012 | Salsbery et al. | 709/226 |
| 2012/0066391 A1* | 3/2012 | Gargash et al. | 709/226 |
| 2012/0084261 A1* | 4/2012 | Parab | 707/654 |
| 2012/0096297 A1* | 4/2012 | Archibald et al. | 713/340 |
| 2012/0143887 A1* | 6/2012 | Fontenot et al. | 707/758 |

OTHER PUBLICATIONS

U.S. Patent and Trademark Office, Office Action issued in related U.S. Appl. No. 13/248,101, dated May 28, 2013.

U.S. Patent and Trademark Office, Final Office Action issued in related U.S. Appl. No. 13/248,101, dated Feb. 14, 2014.

* cited by examiner

AUTOMATED HIGH RESILIENCY SYSTEM POOL

FIELD OF THE INVENTION

The present invention relates to computing systems, and more particularly to building a high resiliency system pool in a computing system.

BACKGROUND OF THE INVENTION

Computing system technology has advanced at a remarkable pace with each generation of computing system increasing in performance, functionality, and storage capacity, often at a reduced cost. Despite these many advances, many scientific and business applications still demand massive computing power, which is typically only met by high performance computing systems. One particular type of computing system architecture that is capable of filling this requirement is a parallel processing computing system.

A conventional parallel processing computing system includes a plurality of computing nodes. Some parallel processing computing systems may have hundreds or thousands of individual computing nodes. Each computing node is generally of modest computing power and typically includes one or more processing units, or computing cores. As such, each computing node may be a computing system configured with an operating system and at least a portion of a distributed application. The distributed application subdivides a workload into tasks and provides the task or tasks to each computing node. Thus, the parallel processing computing system completes a workload by configuring the computing nodes to cooperatively perform one or more tasks such that the workload is processed substantially in parallel.

Parallel computing systems generally comprise a plurality of nodes each configured with various hardware resources. To overcome hardware resource failure, computing nodes may include redundant hardware resources. Those of ordinary skill in the art will recognize that redundancy with respect to a hardware resource means that the computing node includes one or more additional hardware resources than is generally required for operation. Thus, if a hardware resource failure occurs in a computing node, the computing node is able to use a redundant hardware resource to continue to function. The redundant hardware resources present in a computing node thereby increase its resiliency. Often in parallel computing systems, it is desirable for the distributed application to assign tasks to computing nodes that are redundant with respect to one or more hardware resources.

In parallel computing systems, it is also desirable to group computing nodes in the computing system into virtual system pools within the parallel computing system. Generally, computing nodes with similar hardware resource configurations may be grouped into virtual system pools, such that the distributed application may distribute tasks requiring a certain resource configuration to computing nodes assigned to a virtual system pool which has computing nodes with the desired resource configuration assigned to it. Hence, grouping computing nodes into virtual system pools allows the distributed application to more efficiently assign tasks to computing nodes in the computing system. In conventional systems, the assignment of computing nodes based on the hardware resources configured thereon is performed by a system administrator. Hence, the system administrator may evaluate the hardware resource configurations of computing nodes in the system and assign the computing nodes to one or more virtual system pools.

While grouping computing nodes of the computing system into virtual system pools may increase efficiency of the system, manual analysis and assignment by a system administrator becomes very time consuming in large parallel computing systems. Moreover, manual analysis and assignment by a system administrator may often lead to erroneous assignment of computing nodes to a virtual system pool, which may decrease the efficiency of the system. In addition, the system administrator also must update and manage the virtual system pool in light of events that might change the configuration of hardware resources on the computing node (i.e. additions of new hardware resources in a computing node, failure of hardware resources in a computing node, replacement of hardware resources in a computing node, etc.).

As computing nodes in the computing system are assigned a task to perform by the distributed application, hardware resources of the computing node are utilized, and the computing node becomes less available to perform additional tasks, while other computing nodes become more available in comparison because the computing nodes have not yet been assigned tasks to perform. Hence, some computing nodes become highly available to perform a task, while other computing nodes become less available as tasks are assigned to them to be performed.

Consequently, there is a continuing need in the art for a way to identify and efficiently group computing nodes.

SUMMARY OF THE INVENTION

Embodiments of the invention provide for a method, apparatus, and program product to identify resilient computing nodes in a computing system, creating and managing a high resiliency virtual system pool that includes the resilient computing nodes, and dynamically evaluating availability of computing nodes in the virtual system pool in response to the distributed application assigning tasks. In particular, embodiments of the invention provide for analyzing a plurality of hardware resources available on a first computing node in the computing system to identify which, if any, hardware resources are redundant in the computing node, and adjusting an identifier associated with the analyzed computing node for each type of hardware resource the analyzed node has redundant hardware resources configured thereon. The embodiments of the invention selectively assign the analyzed node to a high resiliency virtual system pool based upon the associated identifier and the identified redundant hardware resources configured on the analyzed computing node.

Hence using the disclosed invention, a plurality of computing nodes may be analyzed for one or more redundant hardware resources and a high resiliency virtual system pool may be created and maintained. These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

Figure 1:
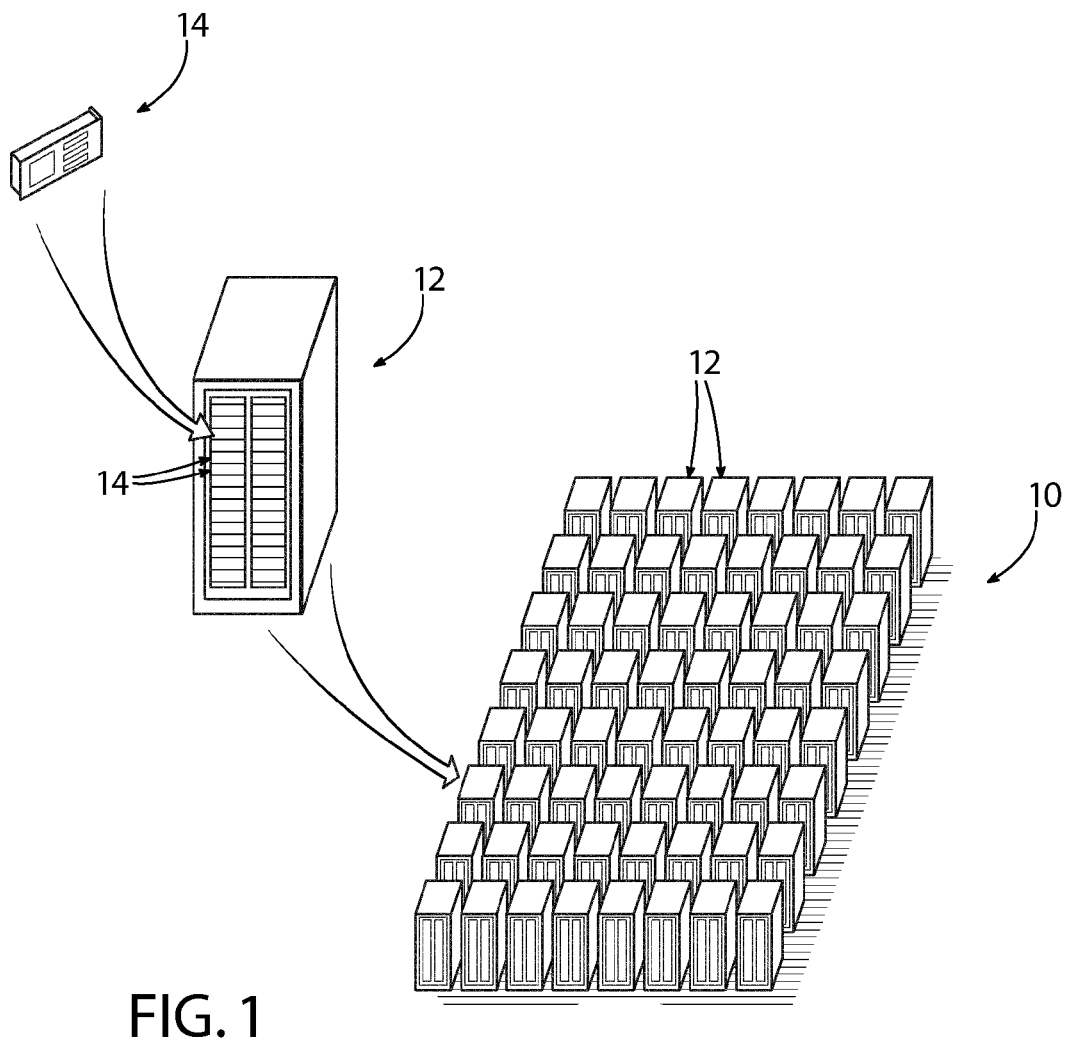
FIG. 1 is a diagrammatic illustration of an architecture of a parallel processing computing system showing the organization and structure of a plurality of computing nodes therein consistent with embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION OF THE INVENTION

Embodiments of the invention provide for a method, apparatus, and program product to address identifying resilient computing nodes in a computing system and creating and managing a high resiliency virtual system pool that includes the resilient computing nodes.

Virtual system pools are typically used by computing systems to group computing nodes into categories of computing nodes with similar attributes. This enables the creation of virtual computing systems in a virtual system pool. High resiliency system pools are often targeted for enterprise business applications that require hardware redundancy to provide high availability business solutions.

In platform management systems, tasks may be deployed onto virtual computing systems. For high availability solutions, the workloads deployed onto the virtual computing systems may be deployed onto physical computing node resources that will provide redundancy and fail-over capabilities to maintain the high availability of the system and enterprise applications. For parallel computing systems, such as blade, mainframe, modular, and supercomputer computer systems, multiple hardware resources are installed to provide the required system resiliency. Multiple computing nodes may be installed in the computing system to provide hardware redundancy and system resiliency. In addition, chassis interconnect fabric technology may be used to provide fast inter-chassis communication and enables the virtualization and pooling of computing node hardware resources for use by workloads within the parallel computing system. Understanding which computing node is best suited for supporting a workload requiring highly resilient hardware becomes even more important in this type of environment where highly connected computing nodes provide many potential placement plans. In this environment the physical hardware resources that may be made resilient include such resources as power supply units and/or power supply capacity, cooling components, processing units, memory blocks, and I/O interfaces.

In conventional systems, a solution for grouping the computing nodes including installed hardware resources meant for resiliency support into a virtual system pool designed for high availability is not available. Grouping the computing nodes typically requires knowledge of: the physical system topology, (e.g., the hardware resources' physical and logical connections within the computing node or computing system); hardware resource constraints that may prevent the use of the redundant hardware resources, (e.g., a switch may prohibit access to an I/O network interface meant for redundancy); inclusion of the computing nodes in other virtual system pools.

Manually processing and implementing all of these factors by an administrative staff is time-consuming and complex. Incorrect classification of hardware components leads to the specification of a system that does not meet the required resiliency. A manual implementation is also not very dynamic and therefore may not be timely enough for addressing the needs of a data center with highly-scaled computing systems with hundreds of computing nodes and hundreds of hardware resources, many virtual system pools, and even more virtual computing systems. Moreover, in a complex environment the same data may also have to be re-entered into multiple system management tools to ensure redundancy does occur across multiple computing nodes and computers of a parallel computing system.

High performance computing systems, such as parallel processing computing systems, often comprise a plurality of computing nodes, where the computing nodes may comprise a plurality of possibly redundant hardware resources. The computing system is configured to receive a workload and divide the workload into parts, or tasks that are operable to be executed, or processed, primarily by the computing nodes. As discussed above, redundancy of the plurality of hardware resources and the ability to assign a computing node to a high resiliency virtual system pool based on the hardware resources configured thereon is extremely useful in most parallel processing computing system implementations. Embodiments of the invention address shortcomings of conventional computing systems.

In some embodiments, the computing system maintains domain knowledge data, which may include the number and type of the plurality of hardware resources required on computing nodes in the computing system to support redundancy. This domain knowledge data may include, but is not limited to, for example: the maximum number of supported I/O adapters in a computing node and paring requirements for redundancy; the number of supported power supply units in a computing node and the amount of power supply capacity required to support redundancy; the number of processing units in a computing node required to support redundancy; the number of computing nodes in the computing system; power and cooling limits required for the system in the event of a hardware failure; etc. Moreover, in computing systems consistent with embodiments of the present invention, the domain knowledge data may be generated and updated by manual configuration or through one or more automated processes executing on the computing system. The resulting domain knowledge data may incorporate various factors present in the configuration of the computing system, such as hardware resource requirements and capabilities of computing nodes in the computing system. For example, the computing system may receive input from an administrator of the system regarding system hardware requirements, or in the alternative, the computing system may analyze one or more computing nodes to determine the hardware resource requirements of the hardware resources configured thereon. Hence, the domain knowledge data may be uniform across the entire computing system, or alternatively, the domain knowledge data may be unique with regard to different computing nodes, or subsets of computing nodes in the computing system. In computing systems consistent with embodiments of the present invention, the domain knowledge data may be generated and updated by manual configuration or through one or more automated processes executing in the computing system. For example, the computing system may analyze computing nodes and determine hardware requirements of the computing nodes prior to analysis of the computing node for redundancy, generate the domain knowledge data, and store the results of the analysis in one or more memory blocks of the computing system. In this example, the computing system may access this stored domain knowledge data for utilization in the analysis of the computing nodes for redundancy. In alternative embodiments, prior to or during analysis for redundancy of the computing node, the computing system may also generate domain knowledge data associated with the one or more computing nodes being analyzed for redundant hardware resources. Hence, in these alternatives, the generation of the domain knowledge data generally corresponds to the computing system analyzing computing nodes for redundant hardware resources.

In some embodiments, the computing system maintains system hardware data, where the system hardware data may include, but is not limited to: the number and specific type of I/O interfaces in a computing node connected to a specific external resource; the number of power supply units or total power supply capacity in a computing node; the number of cooling components in a computing node; the number of processing units in a computing node, and the number of processing units available in a computing node; etc. Therefore, in some embodiments of the invention the above described domain knowledge data and the system hardware data are used to analyze a plurality of computing nodes in a computing system for redundant hardware resources and to selectively assign computing nodes to high resiliency virtual system pools. In computing systems consistent with embodiments of the present invention, the system hardware data may be generated and updated by manual configuration or through one or more automated processes executing on the computing system. For example, the computing system may analyze computing nodes and identify hardware resources configured on the computing nodes prior to analysis of the computing node for redundancy, generate the system hardware data, and store the results of the analysis in one or more memory blocks of the computing system. In this example, the computing system may access this stored system hardware data for utilization in the analysis of the computing nodes for redundancy. In alternative embodiments, prior to or during analysis for redundancy of the computing node, the computing system may also generate system hardware data associated with the one or more computing nodes being analyzed for redundant hardware resources. Hence, in these alternatives, the generation of the system hardware data generally corresponds to the computing system analyzing computing nodes for redundant hardware resources.

The invention introduces a method, apparatus, and program product that allow a computing system with knowledge of the hardware resources of the computing nodes to navigate the system hardware data and automate the classification of the computing nodes into a high resiliency virtual system pool. Once a high resiliency system pool has been defined workloads may be ensured of running in a high availability environment when they are placed or relocated within the pool. The automation provided by invention may occur dynamically in a virtual system pool with active workloads. This ensures that events that affect the resiliency and/or availability of the hardware resources of computing nodes in the virtual system pool are taken into account by the computing system in real-time.

Domain knowledge data may be used to correctly group computing nodes into virtual system pools. Moreover domain knowledge data may also be applied to further categorize hardware resources of computing nodes into high resiliency system pools. The computing system may search the system hardware data for the hardware resources configured on a computing node and use the domain knowledge data to determine redundancy of the hardware resources which provide the computing node resiliency. In some embodiments, the invention utilizes the system hardware data and domain knowledge data to categorize the computing nodes in one or more virtual system pools.

The computing system conducts a search for redundant hardware, specifically, but not limited to: redundant cooling components, redundant power supplies and/or excess power supply capacity, redundant processing units, redundant memory blocks, and redundant I/O interfaces. The computing system may analyze the system hardware data of a computing node and apply the domain knowledge. If the hardware resources of a computing node meet the criteria for resiliency, the computing node is entered into a virtual system pool designated as the high resiliency virtual system pool associated with redundancy of one or more hardware resources.

In addition, the analysis performed during the formation of the high resiliency virtual system pool may be utilized by the distributed application in determining workload placement when workloads and/or tasks are placed within the system pool. Furthermore, the analysis performed may be utilized to automate the monitoring of system health, and for providing alerts when a hardware failure changes the status of the resiliency of the computing system, a computing node, or a virtual system pool. Hence, in some embodiments, the invention effectively provides a mechanism for dynamically determining which computing nodes should be included in a virtual system pool given the current status of hardware resources on computing nodes in the computing system.

In one embodiment, a plurality of types of hardware resources configured on a first computing node are analyzed to determine whether any of the plurality of hardware resources on the first node are a redundant hardware resource. An identifier associated with the first computing node is adjusted for each type of hardware resource on the first node that has redundant hardware resources. The first computing node may be selectively assigned to a high resiliency virtual system pool based upon the identified types of hardware resources configured on the first computing node that are redundant. In further embodiments, the first node may be selected from the high resiliency virtual system pool to perform a task.

When a specific type of redundant hardware is found on the first node, an identifier may be adjusted. Furthermore, in some embodiments, the first computing node is selectively assigned to a high resiliency virtual system pool, when the first node is associated with a redundant hardware resource matching a target type of hardware resource, and the target type of hardware resource is associated with the high resiliency virtual system pool. Hence, in these embodiments, the high resiliency virtual system pool may include computing nodes that included one or more target types of redundant hardware. For example, if an analyzed computing node included redundant processing units, and the high resiliency virtual system pool included computing nodes resilient with respect to processing units, the analyzed node may be assigned to the high resiliency virtual system pool. Likewise, if a highly resilient virtual system pool included computing nodes resilient with respect to cooling components and processing units, an analyzed node that included redundant cooling components and processing units may be selectively assigned to the particular high resiliency virtual system pool.

In some embodiments, the high resiliency virtual system pool indicates high availability environments in which to perform a task. In computing systems with a plurality of nodes, the plurality of hardware resources on each computing node become unavailable as the various hardware resources on the computing nodes are used to carry out tasks assigned by the distributed application. Thus, some computing nodes may become less available for completing additional tasks in response to the assigning of tasks by the distributed application, whereas other computing nodes may be highly available, as compared to computing nodes already assigned tasks. Hence, in some embodiments consistent with the invention, the high resiliency virtual system pool includes one or more resilient computing nodes, where the virtual system pool may further indicate high availability environments in which to perform a task. In some embodiments, the identifier associated with a computing node is adjusted to indicate that the computing node is the highest available environment in which to perform a task as compared to some or all of the computing nodes assigned to a high resiliency virtual system pool. Meaning that the one or more computing nodes in the high resiliency virtual system pool have associated identifiers that indicate the availability of hardware resources configured on each computing node, and a computing node in the high resiliency virtual system pool may be selected to perform a task based on the identifier associated with the computing node. In some embodiments, availability of a computing node is most related to the use and availability of processing units configured on the computing node. Hence, in these embodiments, a computing node is not available when all the processing units of the computing node are being utilized to execute assigned tasks, and the computing node becomes more available as processing units of the computing node are not executing assigned tasks.

Embodiments of the invention contemplate adjusting the identifier associated with the analyzed computing node in a number of ways. For example, a counter associated with an analyzed computing node may be incremented for each type of hardware resource on the first computing node that has redundant hardware resources. In this example, the analyzed computing node may be assigned to a high resiliency system pool if the counter exceeds a target value. In other embodiments, flags associated with the analyzed computing node may be selectively set for each type of hardware resource on a first computing node that has redundant hardware resources. In these embodiments, a plurality of flags may be associated with a computing node, and of the plurality of flags, each flag may be associated with a certain type of hardware resource. Therefore, when a first computing node is redundant with respect to a certain type of hardware resource, the flag associated with the first computing node and the type of hardware resource may then be set. The set flag may then indicate that the first computing node had redundant hardware resources of the certain type associated with the set flag. In these embodiments, the analyzed computing node may be assigned to a virtual system pool depending on which flags associated with the computing node and a type of hardware resource are set. In further embodiments, a counter may be incremented for each flag set. Hence, in these embodiments, the counter may represent the total number of types of hardware resources that were redundant on an analyzed computing node. Further embodiments may selectively assign the analyzed node to the high resiliency virtual system pool when the flag counter exceeds a target value. Therefore, in these further embodiments, computing nodes resilient with respect to a given number of types of hardware resources may be selectively assigned to the high resiliency virtual system pool.

Turning to the drawings, wherein like numbers may denote like parts throughout several views, FIG. 1 is a diagrammatic illustration of a parallel processing computing system 10 that includes computer 12 and a computing node 14, where the computing system 10 includes one or more computers 12 connected to a network.

Figure 2:
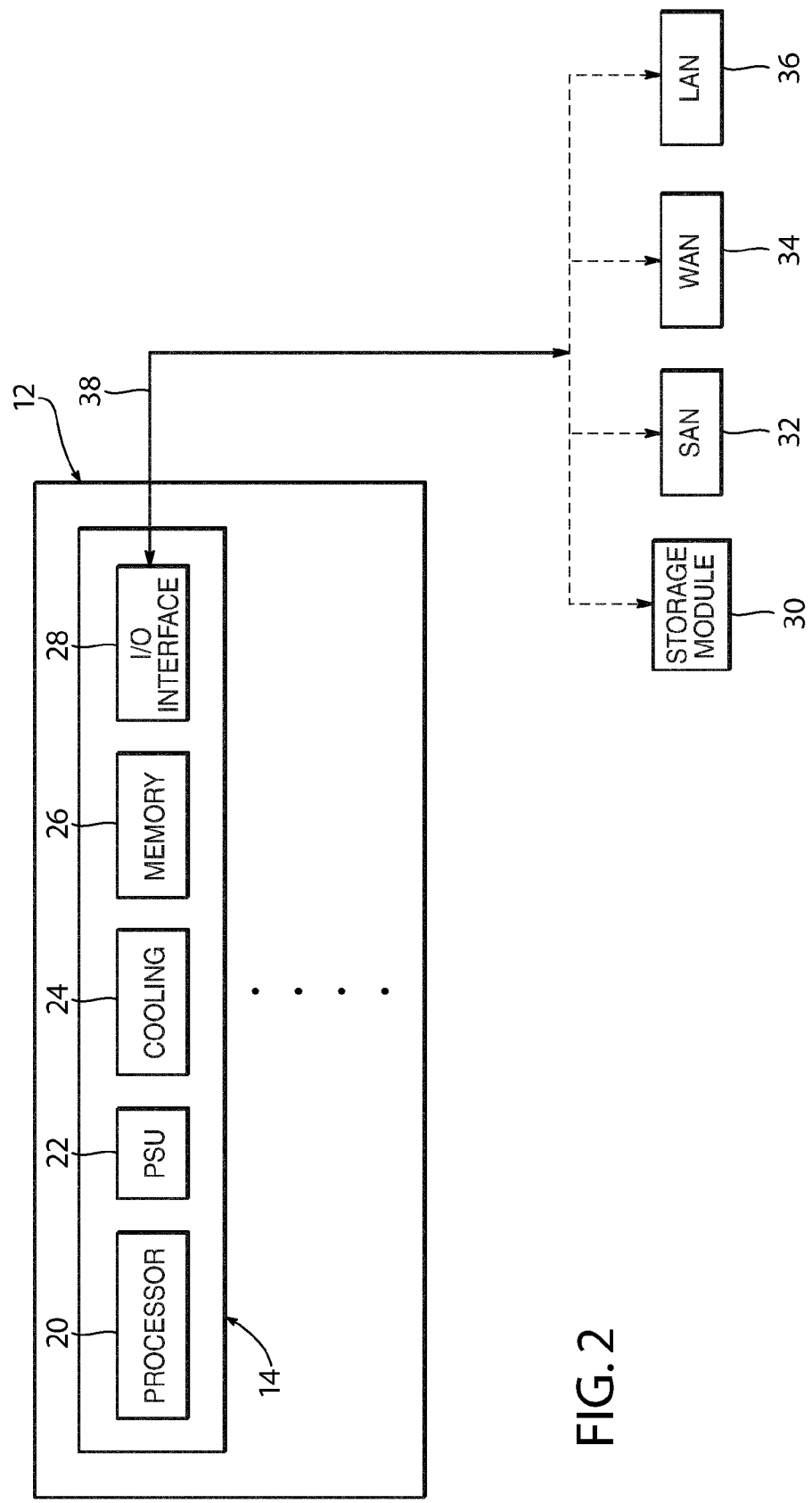
FIG. 2 is a diagrammatic illustration of a computer and/or parallel processing computing system of FIG. 1 further illustrating a computing node of the computing system and hardware resources of the computing node.

FIG. 2 is a diagrammatic illustration of a computer 12 including one or more computing nodes 14. The computing nodes 14 includes hardware resources 20, 22, 24, 26, and 28 configured thereon, including processing unit 20, power supply 22, cooling component 24, memory 26, and I/O interface 28. Computing nodes 14 are connected to external resources storage module 30, storage area network 32, wide area network 34, and local area network 36 through one or more I/O interface 28 via one or more connections 38. As discussed previously, the number and type of hardware resources present in a computing node 14 may vary, hence, FIG. 2 illustrates one example embodiment. Furthermore, for clarity, the types of hardware resources 20, 22, 24, 26, 28 available on each computing node 14 has been represented as a block; however, those skilled in the art will recognize that each hardware resource block 20, 22, 24, 26, 28 may represent one or more of the same type of hardware resource (e.g. processing unit 20 represents one or more processing units configured on the computing node 14, etc.).

Figure 3:
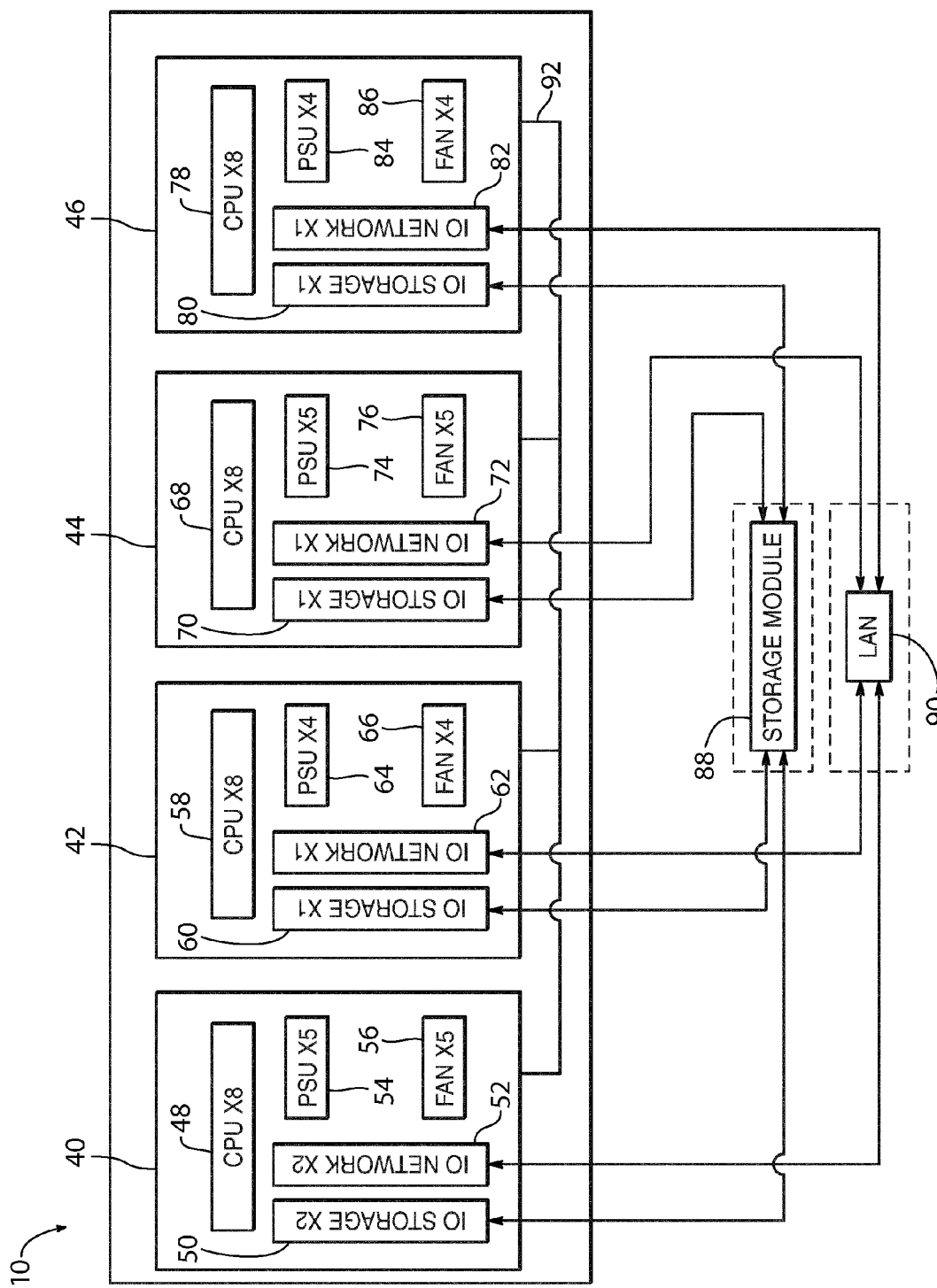
FIG. 3 is a diagrammatic illustration of an exemplary configuration of a parallel computing system of FIG. 1 further illustrating multiple computing nodes and various hardware resources configured on the computing nodes.
Figure 5:
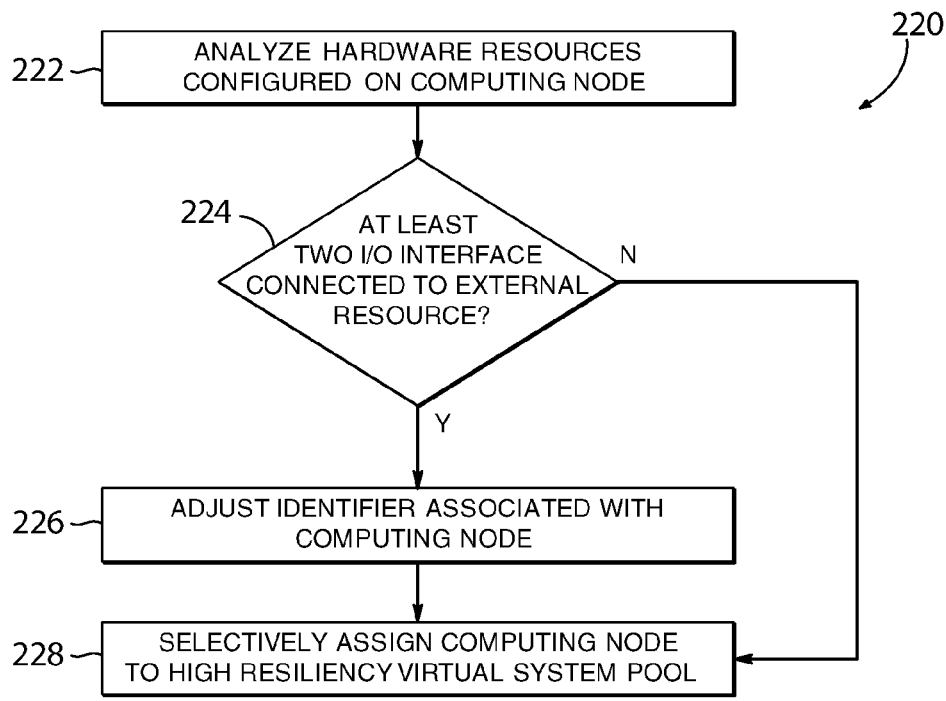
FIG. 5 is a flow chart illustrating a sequence of operations for the computer and/or computing system of FIG. 1, 2, or 3 to analyze I/O interface components configured on a computing node and selectively assign the computing node to a virtual system pool.
Figure 6:
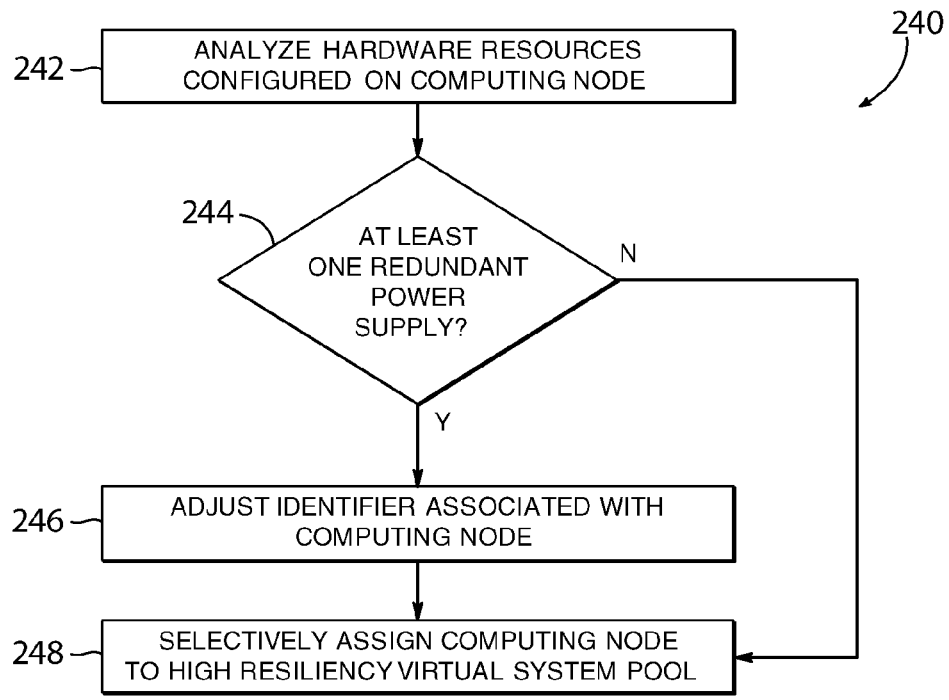
FIG. 6 is a flow chart illustrating a sequence of operations for the computer and/or computing system of FIG. 1, 2, or 3 to analyze power supply units configured on a computing node and selectively assign the computing node to a virtual system pool.

In FIG. 3, computing node 40 is configured with eight processing units 48, two I/O storage interfaces 50, two I/O network interfaces 52, five power supply units 54, and five cooling components 56. Computing node 42 is configured with eight processing units 58, one I/O storage interface 60, one I/O network interface 62, four power supply units 64, and four cooling components 66. Computing node 44 is configured with eight processing units 68, one I/O storage interface 70, one I/O network interface 72, five power supply units 74, and five cooling components 76. Computing node 46 is configured with eight processing units 78, one I/O storage interface 80, one I/O network interface 82, four power supply units 84, and four cooling components 86. Computing node 40 is connected through the two I/O storage interfaces 50 to storage module 88, and through the two network interfaces 52 to LAN 90. Computing node 42 is connected through I/O storage interface 60 to storage module 88, and through I/O network interface 62 to LAN 90. In addition, computing node 40, computing node 42, computing node 44, and computing node 46 are connected via node connection 92, where node connection 92 may allow the fast migration of workloads between computing nodes 40, 42, 44, and 46. Computing node 44 is connected to the storage module 88 through I/O storage interface 70, and through I/O network interface 72 to LAN 90. Computing node 46 is connected to storage module 88 through I/O storage interface 80, and through I/O network interface 82 to LAN 90.

Those skilled in the art will recognize that FIGS. 1-3 are not intended to limit the invention. In addition, FIG. 3 is a diagrammatic illustration of one exemplary embodiment of a computing system 10 which includes computing nodes 40, 42, 44, 46 configured with various hardware resources. As such, the types and numbers computing nodes, hardware resources, external resources, and computing node connections are only for illustrative purposes. Hence, while FIG. 3 provides numbers and types of the hardware resources of computing nodes in an exemplary computing system, the illustration does not serve to limit the invention, but merely serves illustrative purposes. As such, as those skilled in the art recognize, any number and/or configuration of hardware resources and computing nodes may be used in an embodiment consistent with the invention.

The routines executed to implement the embodiments of the invention, whether implemented as part of an operating system or a specific application, component, program, object, module or sequence of operations executed by one or more processors of the computing system 10 will be referred to herein as "computer program code" or simply "program code." For example, referring to the computer and/or computing system of FIG. 2, the computer program code typically comprises one or more instructions that are resident at various times in various memory 26 and/or storage devices in the computing system 10, and that, when executed by one or more processors 20 of the computing system 10, may cause the computing system to perform the steps necessary to execute steps, elements, and/or blocks embodying the various aspects of the invention. In addition, those skilled in the art will recognize that embodiments of the invention are not limited to particular types or configurations of processors or memory and/or storage devices.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, for example, non-transitory recordable type media such as volatile and nonvolatile memory devices, floppy and other removable disks, hard disk drives, USB drives, optical disks (e.g. CD-ROM's, DVD's, Blu-Ray discs, etc.), among others.

In addition various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environments illustrated in FIGS. 1-3 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

In addition, one or more processors of the computing system may execute computer program code in one or more memory and/or storage devices of the computing system, and that the memory may represent the random access memory (RAM) devices comprising the main storage of a computer, as well as any supplemental levels of memory, e.g., cache memories, non-volatile or backup memories (e.g., programmable or flash memories), read-only memories, etc. In addition, a memory may be considered to include memory storage physically located elsewhere in a computer, e.g., any cache memory in a processor, as well as any storage capacity used as a virtual memory, e.g., as stored on a mass storage device or on another interconnected computer. In addition, those skilled in the art will recognize that the invention may be implemented on various types of parallel processing systems such as blade computing systems, where one or more computers in the blade computing system may execute a sequence of one or more operations consistent with embodiments of the invention. Moreover, the invention may be used in connection with other types of parallel processing computing systems such as mainframes, supercomputers, etc.

Figure 4:
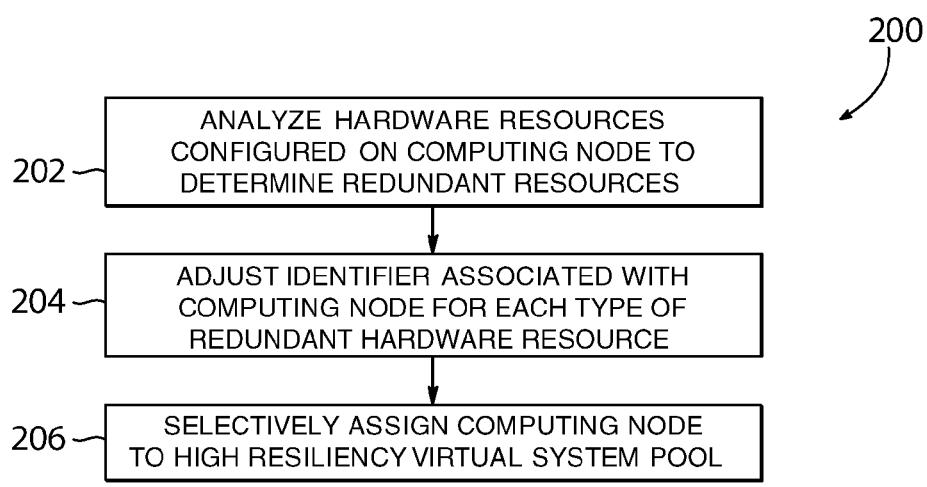
FIG. 4 is a flow chart illustrating a sequence of operations for the computer and/or computing system of FIG. 1, 2, or 3 to analyze a computing node and assign the computing node to a virtual system pool.

FIG. 4 is a flowchart 200 illustrating a sequence of operations that may be executed by a parallel processing computing system consistent with embodiments of the invention. The computing system analyzes a computing node to determine redundant resources configured on the computing node (block 202). The computing system adjusts an identifier associated with the analyzed computing node for each type of redundant hardware resource configured on the analyzed computing node (block 204). The computing system selectively assigns the analyzed computing node to a high resiliency virtual system pool (206).

Analysis of the hardware resources of the computing nodes may be performed using a variety of techniques. As described above, in some embodiments, the computing system utilizes system hardware data and domain knowledge data to determine the hardware resources configured on the analyzed node and redundancy requirements for the various hardware resources for the computing system. In these embodiments, the computing system analyzes the system hardware data stored in the computing system to determine the hardware resources configured on the computing node being analyzed. In some embodiments, the computing system leverages the domain knowledge data related to the computing node being analyzed to determine if the hardware resources configured on the computing node are redundant. Furthermore, in some embodiments, assignment to a virtual system pool will depend on the hardware resource requirements of the virtual system pool. The requirements of a virtual system pool may be provided by an administrator of the system, or in the alternative, may be determined dynamically by the computing system. For example, when tasks from a workload are assigned by the distributed application, the computing system may determine hardware resource requirements desirable for computing nodes assigned tasks in the workload, and the computing system may define the requirements of a virtual system pool meeting the hardware resource requirements. In these embodiments, the computing system dynamically determines the hardware resource requirements for a virtual system pool in response to the hardware resource requirements of one or more tasks in a workload assigned to the computing system.

For example, referring to FIG. 3, system hardware data may indicate that computing node 40 is configured with eight processing units 48, and five power supply units. In this example, domain knowledge data may indicate that two processing units require one power supply. Hence, in this example, the computing system may analyze computing node 40 and determine that computing node 40 has one more power supply unit than required (block 202). Following this example, the computing system may adjust the identifier associated with computing node 40 for power supply units (block 204). If the hardware resource requirements of the virtual system pool required a computing node to have at least one excess power supply unit configured thereon, in this example, computing node 40 may be assigned to the virtual system pool (block 206).

FIGS. 5-10 are flowcharts 220, 240, 260, 280, 300, 320 illustrating sequences of operations that may be executed by a parallel processing computing system consistent with embodiments of the invention. FIGS. 5-10 illustrate the computing system determining whether a computing node includes a desired configuration and type of a specific hardware resource (blocks 224, 244, 264, 284, 304, and 324, respectively) and adjusting the identifier associated with the analyzed computing node in response to the determination (blocks 226, 246, 266, 286, 306, and 326, respectively). Specifically, In FIG. 5, the computing system analyzes the hardware resources configured on a computing node (block 222). The computing system determines whether the computing node includes at least two I/O interface connected to an external resource (block 224). If the computing node includes at least two I/O interface connected to an external resource, the identifier associated with the computing node is adjusted by the computing system (block 226). The computing system selectively assigns the computing node to a virtual system pool (block 228). Similarly, in FIG. 6, the computing system determines whether the computing node includes at least one redundant power supply; in FIG. 7, the computing system determines whether the computing node includes excess power supply capacity; in FIG. 8, the computing system determines whether the computing node includes at least two redundant processing units; in FIG. 9, the computing system determines whether the computing node includes at least one redundant cooling component; and in FIG. 10, the computing system determines whether the computing node includes at least two redundant blocks of memory. In FIGS. 5-10, the selective assignment of the analyzed computing node to the virtual system pool includes determining whether the analyzed computing node meets the requirements of the virtual system pool. In some embodiments, the computing system determines whether the computing node meets the requirements of the virtual system pool by analyzing the identifier, and assigns the computing node to the virtual system pool if the associated identifier indicates that the computing node meets the requirements of the virtual system pool.

Figure 11:
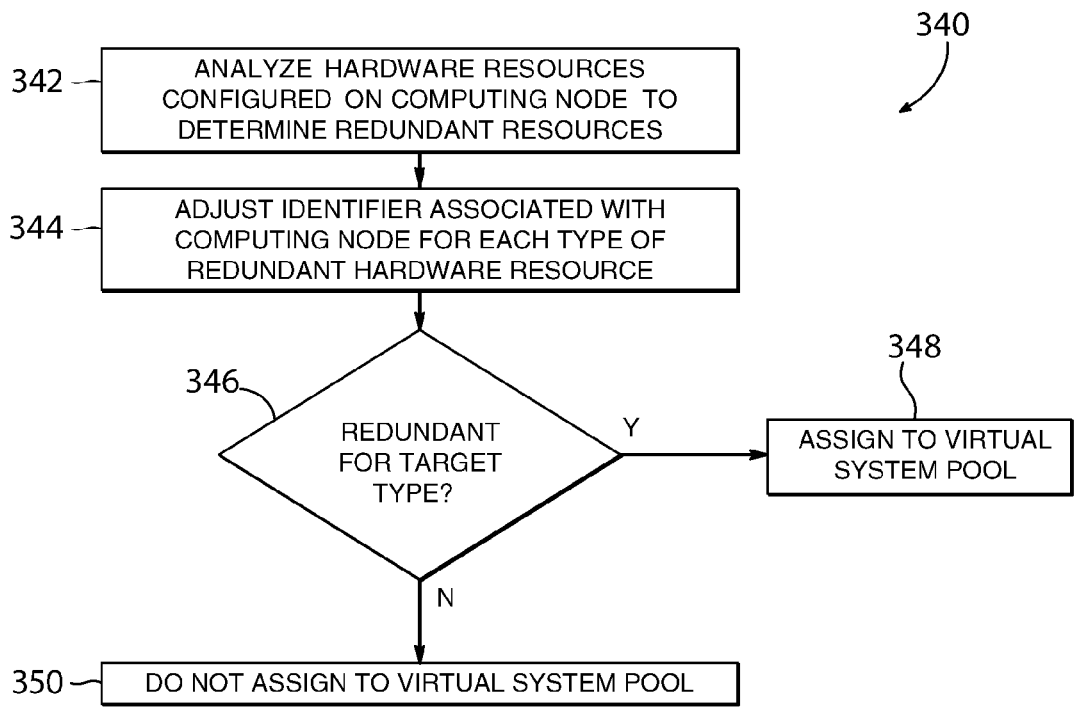
FIG. 11 is a flow chart illustrating a sequence of operations for the computer and/or computing system of FIG. 1, 2, or 3 to selectively assign an analyzed computing node to a virtual system pool.

FIG. 11 is a flowchart 340 illustrating a sequence of operations that may be executed by a parallel processing computing system consistent with embodiments of the invention. The computing system analyzes a computing node to determine redundant resources configured on the computing node (block 342). The computing system adjusts an identifier associated with the analyzed computing node for each type of redundant hardware resource configured on the computing node (block 344). The computing system determines whether the analyzed computing node is configured with redundant resources of a target type for a virtual system pool (block 346). If the analyzed computing node is configured with redundant resources required by the virtual system pool, the analyzed computing node is added to the virtual system pool (block 348). If the analyzed computing node is not configured with redundant resources targeted by the virtual system pool, the analyzed computing node is not added to the virtual system pool (block 350). In FIGS. 6-10, the computing system determines whether the analyzed computing node includes a redundant type of hardware resource required by the virtual system pool.

Figure 7:
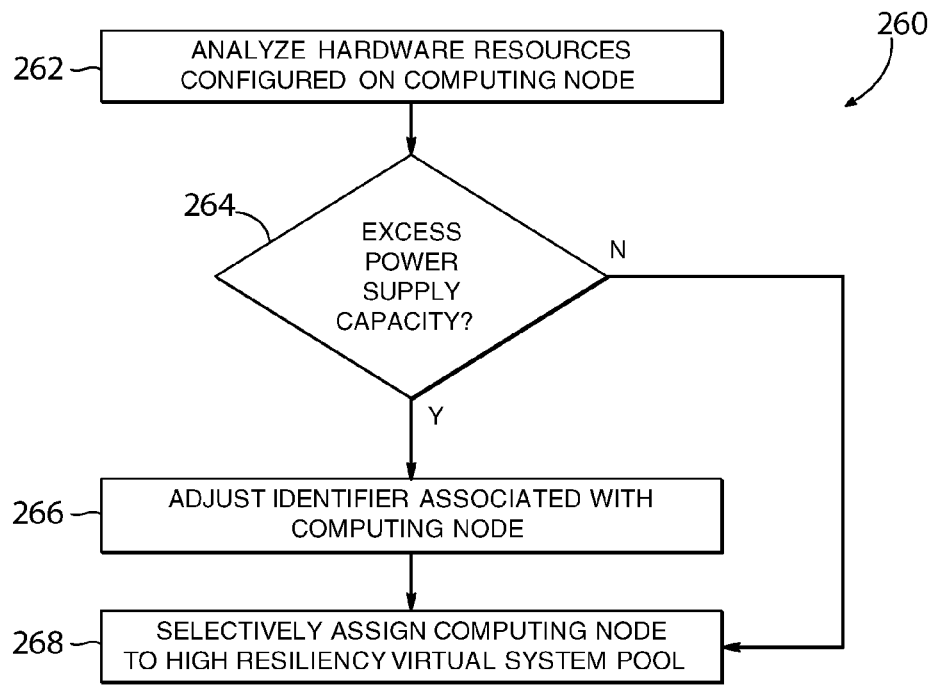
FIG. 7 is a flow chart illustrating a sequence of operations for the computer and/or computing system of FIG. 1, 2, or 3 to analyze excess power supply capacity configured on a computing node and selectively assign the computing node to a virtual system pool.
Figure 12:
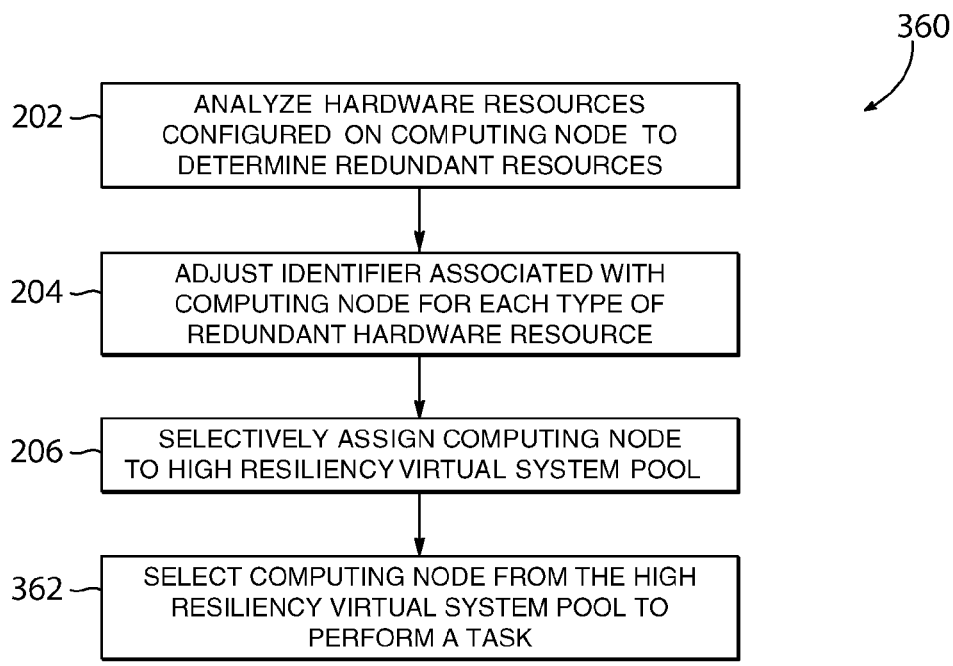
FIG. 12 is a flow chart illustrating a sequence of operations for the computer and/or computing system of FIG. 1, 2, or 3 to analyze a computing node, selectively assign the computing node to a virtual system pool, and select the computing node from the virtual system pool to perform a task.

In regard to FIG. 12, which is a flowchart 360 illustrating a sequence of operations that may be executed by a parallel processing computing system consistent with embodiments of the invention. In FIG. 7, the computing system performs the operations illustrated in FIG. 4, and in addition, the computing system selects a computing node assigned to the virtual system pool to perform a task (block 362).

Figure 8:
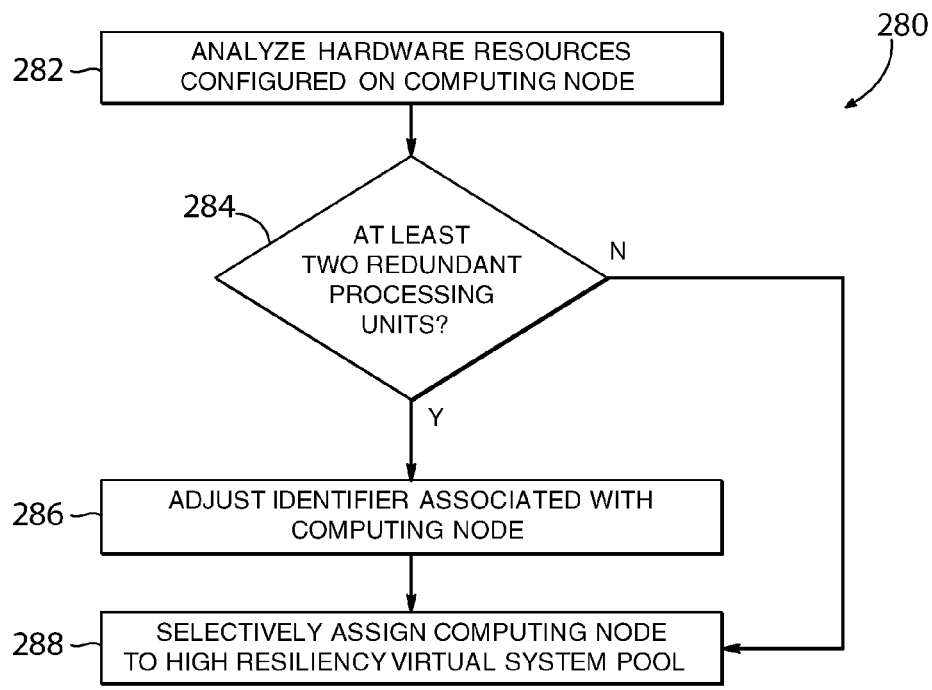
FIG. 8 is a flow chart illustrating a sequence of operations for the computer and/or computing system of FIG. 1, 2, or 3 to analyze processing units configured on a computing node and selectively assign the computing node to a virtual system pool.
Figure 13:
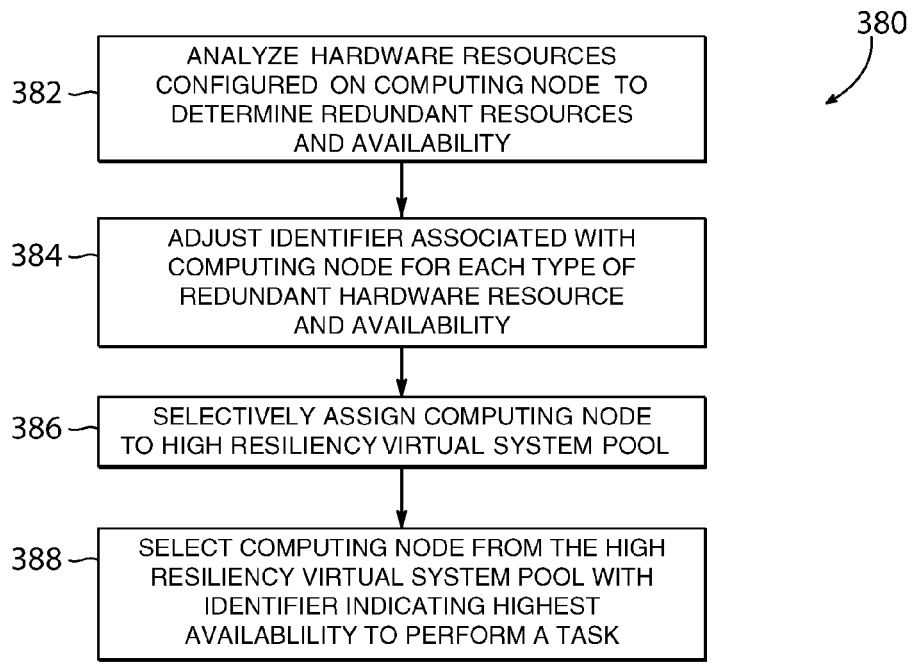
FIG. 13 is a flow chart illustrating a sequence of operations for the computer and/or computing system of FIG. 1, 2, or 3 to analyze a computing node to determine redundancy and availability of resources configured thereon, selectively assign the computing node to a virtual system pool, and select the computing node from the virtual system pool based on the determined availability of the computing node.

FIG. 13 is a flowchart illustrating a sequence of operations that may be executed by a parallel processing computing system consistent with embodiments of the invention. FIG. 8 illustrates the computing system determining not only redundancy of the hardware resources but also availability of the hardware resources configured on the node, and adjusting the identifier associated with the computing node in response to the redundancy of the hardware resources and the availability of the hardware resources. The computing system analyzes the hardware resources configured on the computing node to determine redundancy and availability of the hardware resources (block 382). The computing system adjusts the identifier associated with the computing node for each type of redundant hardware resource configured on the computing node and also based on the availability of the computing node to perform tasks (block 384). The computing system is selectively assigned to a virtual system pool (block 386). The computing system selects a computing node from the virtual system pool to perform a task, where the identifier associated with the computing node indicates that the analyzed computing node is the highest available computing node assigned to the virtual system pool with which to perform a task (block 388).

Figure 9:
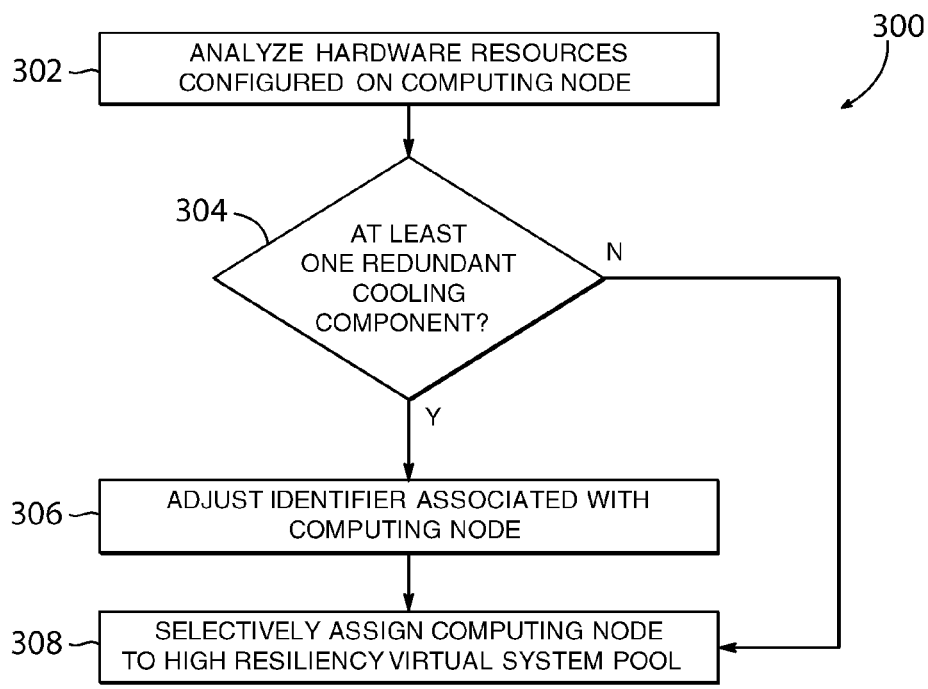
FIG. 9 is a flow chart illustrating a sequence of operations for the computer and/or computing system of FIG. 1, 2, or 3 to analyze cooling components configured on a computing node and selectively assign the computing node to a virtual system pool.
Figure 10:
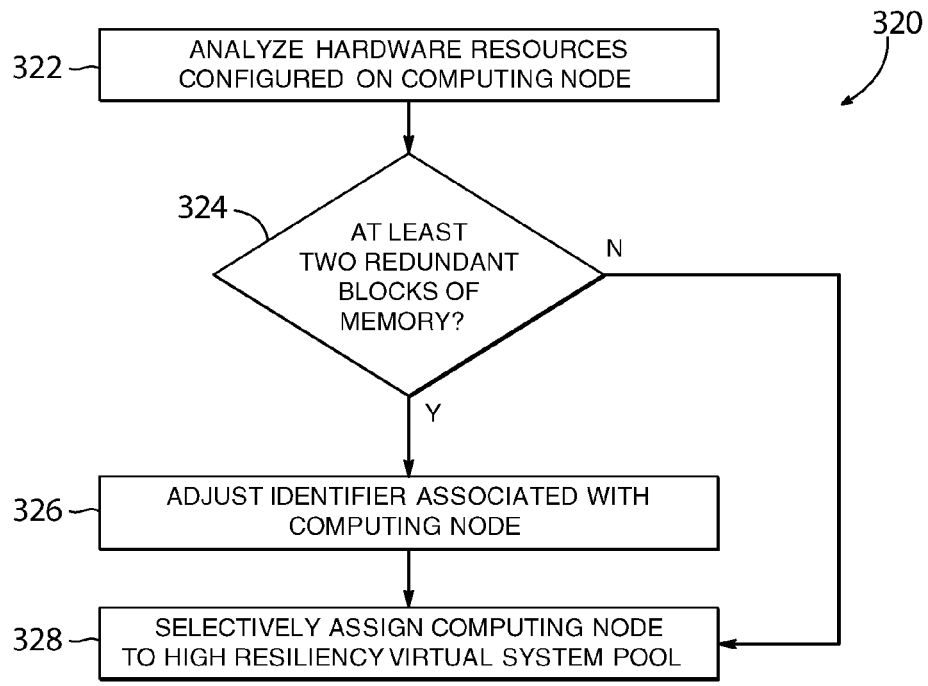
FIG. 10 is a flow chart illustrating a sequence of operations for the computer and/or computing system of FIG. 1, 2, or 3 to analyze memory blocks configured on a computing node and selectively assign the computing node to a virtual system pool.
Figure 14:
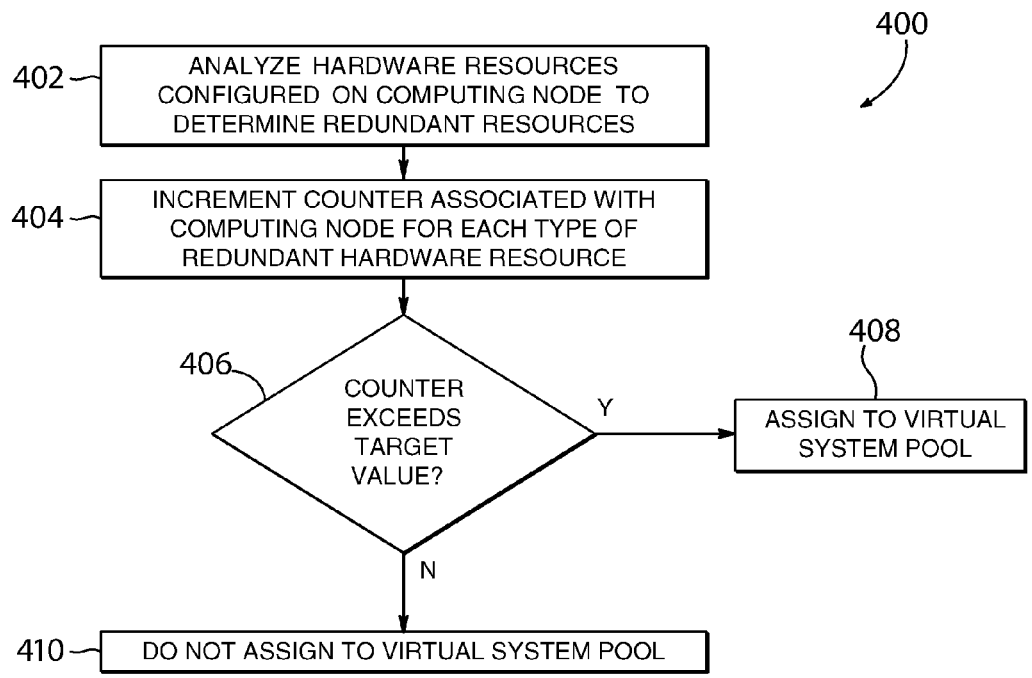
FIG. 14 is a flow chart illustrating a sequence of operations for the computer and/or computing system of FIG. 1, 2, or 3 to selectively assign an analyzed computing node to a virtual system pool.

FIG. 14 is a flowchart 400 illustrating a sequence of operations that may be executed by a parallel processing computing system consistent with embodiments of the invention. In FIG. 9, the computing system analyzes the hardware resources configured on a computing node to determine redundant resources configured thereon (block 402). The computing system increments a counter associated with the computing node for each type of redundant hardware configured on the analyzed computing node (block 404). The computing system determines whether the counter associated with the computing node exceeds a target value (block 406). If the counter exceeds a target value, the computing node is assigned to the virtual system pool (block 408). If the counter does not exceed the target value, the computing node is not assigned to the virtual system pool (block 410).

As shown in FIG. 14, in some embodiments consistent with the invention, the identifier associated with a computing node is a counter, and the computing system increments a counter for each type of redundant hardware resource configured on the computing node. In these embodiments, the incremented counter may be used as a computing node resiliency score by the computing system to rank resiliency of computing nodes relative to other computing nodes. Furthermore, in these embodiments, the resiliency ranking may be used by the computing system in assigning tasks to be performed by computing nodes in the computing system.

For example, referring to FIG. 3, the computing system 10 may analyze the computing nodes 40, 42, 44, 46 and increment a counter associated with each computing node, where the counter associated with each computing node may be further utilized by the computing system when assigning tasks. For the example, assume the following domain knowledge data is known about the computing system 10: (a) two processing units require one power supply unit; (b) two processing units require one cooling component; (c) a computing node may support up to four I/O interfaces; (d) computing nodes 40 and 42 may share excess I/O interfaces if connected over a node connection, and likewise computing nodes 44 and 46 may share excess I/O interfaces if connected over a node connection; (e) two excess processing units are required for redundancy; (f) one excess power supply unit is required for redundancy; (g) one excess I/O interface connected to an external resource is required for redundancy; and (h) one excess cooling component is required for redundancy. For the example, system hardware data regarding the specific configuration of each computing node is shown in FIG. 3, and in addition, the system hardware data indicates that computing node 40 requires six processing units 48, computing node 42 requires six processing units 58, computing node 44 requires seven processing units 68, and computing node 46 requires seven processing units 46.

Analysis of computing node 40 may indicate: redundancy with respect to processing units 48, because system hardware data indicated that computing node 40 included eight processing units 48 and required six, and domain knowledge data indicates that redundancy with respect to processing units requires two excess processing units (see (e)); redundancy with respect to power supply units because system hardware data indicates five power supply units 54 on computing node 40, domain knowledge data indicates that four power supply units are required (see (a)), and domain knowledge data indicates that redundancy with respect to power supply units requires one excess power supply unit (see (f)); redundancy with respect to I/O storage interface 50 connected to storage module 88, because system hardware data indicates two I/O storage interfaces connected to the storage module, and domain knowledge data indicates that redundancy with respect to I/O storage interface requires one excess connection (see (g)); redundancy with respect to I/O network interface 52 connected to the LAN 90, because system hardware data indicates two I/O network interfaces connected to the LAN, and domain knowledge data indicates that redundancy with respect to I/O network interface requires one excess connection (see (g)); redundancy with respect to fans 56 because system hardware data indicates five fans 56, domain knowledge data indicates that four fans 56 are required (see (b)), and domain knowledge data indicates redundancy with respect to cooling components requires one excess cooling component (see (h)). In this example, a counter associated with computing node 40 is incremented for each type of redundant resource configured thereon; hence in this example, the counter associated with computing node 40 may indicate a computing node resiliency score of five. In the example, computing node 42 would have a score of three, because computing node 42 would be redundant with respect to processing units 58, I/O storage interface 60 connected to storage module 88 because computing node 42 would share the excess I/O storage interface 50 of computing node 40 through node connection 92 (see (d)). Computing node 44 would have a computing node resiliency score of two because computing node 44 includes an excess power supply 75 and fan 76 (see (a), (b)). Computing node 46 would have a computing node resiliency score of zero, because it does not have any redundant hardware resources meeting the redundancy requirements of the domain knowledge data.

In the example, the computing system 10 may selectively assign computing nodes 40, 42, 44, 46 to one or more virtual system pools based on the determined computing node resiliency scores. For example, if a first virtual system pool required a computing node to have a computing node resiliency score of one or more, computing nodes 40, 42, and 44 may be assigned to the first virtual system pool. If a second virtual system pool required a computing node to have a computing node resiliency score of four or more, computing node 40 may be assigned to the second virtual system pool. The computing system 10 may selectively assign the computing nodes to one or more virtual system pools based on the associated counters of each computing node.

Furthermore, the computing node resiliency scores may be utilized by the computing system in assigning tasks to computing nodes in a virtual system pool. In reference to the example given above, if computing nodes 40, 42, and 44 were assigned to a virtual system pool, the computing system 10 may assign a task to computing node 40 because computing node 40 has the highest computing node resiliency score. In addition, after assignment of a task to computing node 40, a processing unit 48 may then become required by computing node 40 to perform the assigned task, and the computing system 10 may dynamically update the counter associated with computing node 40 to reflect the assignment of the task.

Figure 15:
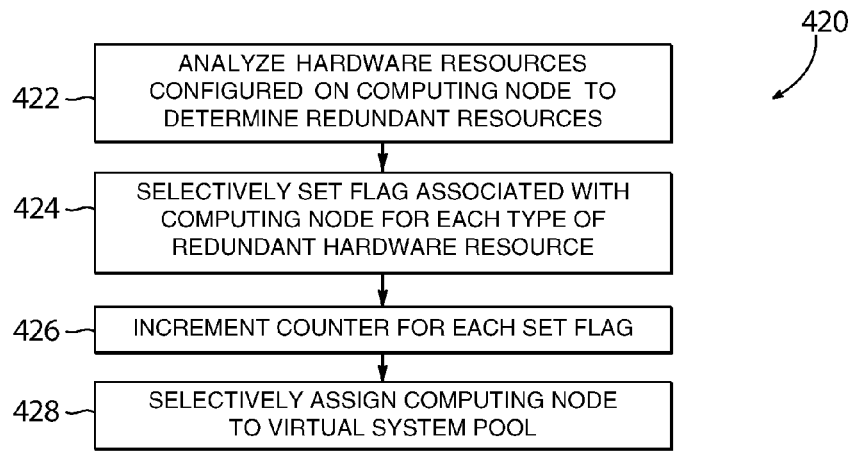
FIG. 15 is a flow chart illustrating a sequence of operations for the computer and/or computing system of FIG. 1, 2, or 3 to selectively adjust an identifier associated with a computing node and selectively assign the computing node to a virtual system pool.

Referring now to FIG. 15, which is a flowchart 420 illustrating a sequence of operations that may be executed by a parallel processing computing system consistent with embodiments of the invention. The computing system analyzes the hardware resources configured on a computing node to determine redundant resources configured thereon (block 422). The computing system selectively sets one or more flags associated with the analyzed computing node for each type of redundant hardware resource configured on the computing node (block 424). The computing system increments a counter associated with the analyzed computing node for each flag associated with the analyzed node that is set (block 426). The computing system selectively assigns the computing node to a virtual system pool (block 428).

As shown in FIG. 15, in some embodiments the identifier associated with the computing node may be a plurality of flags. In these embodiments, the computing system may set a flag in response to determining that the computing node is configured with redundant hardware resources of a specific type. Additionally, the computing system may set a plurality of flags in response to determining that the computing node is configured with redundant hardware resources of a specific type; thus, in these embodiments, the plurality of flags may be associated with a specific type of hardware resource, and the number of flags set may indicate the number of the type of hardware resource configured thereon. For example, referring to FIG. 3 and specifically to computing node 40 if system hardware data and domain knowledge data provided that eight processing units 48 were configured thereon, and only four were required, the computing system may set four flags associated with computing node 40 and processing units to indicate that computing node 40 included four redundant processing units 48 (block 424). In an alternative example using the same system hardware data and domain knowledge data, the computing system may set only one flag associated with computing node 40 and a hardware resource type, and in this example, since computing node 40 is configured with redundant processing units, the computing system may set a flag (block 424). In another example, if system hardware data and domain knowledge data indicated that computing node 40 included two I/O network interfaces 52 and computing node 42 included one I/O network interface 62, the computing system may set a flag associated with computing node 40 and a flag associated with computing node 42 (computing node 42 may share the redundant I/O network interface of computing node 40 through the node connection 92). In some embodiments, the computing system may determine if a computing node meets the requirements of a virtual system pool based on the set flags associated with the computing node. In other embodiments, the computing system may increment a counter associated with a computing node for each set flag associated with the computing node, and the computing system may determine if the computing node meets the requirements of a virtual system pool based on the counter associated with the computing node.

Figure 16:
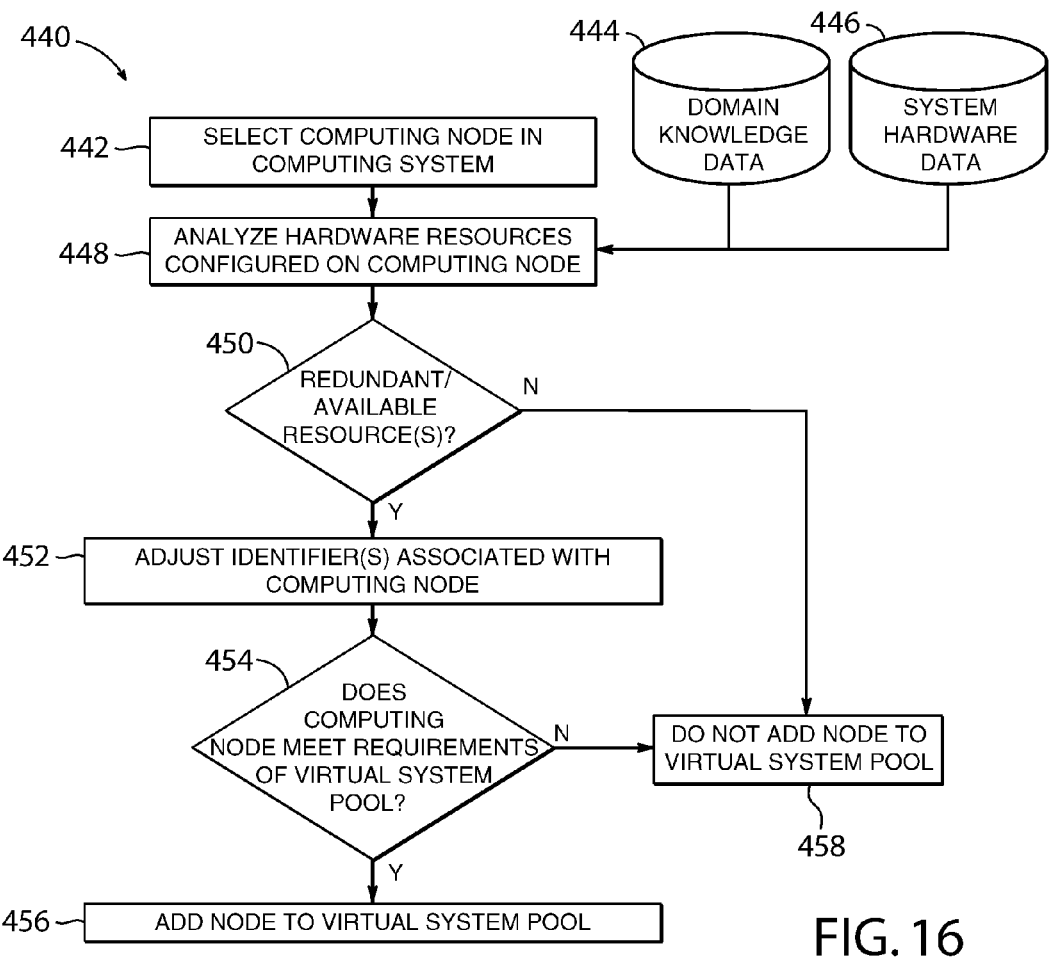
FIG. 16 is a block diagram illustrating a sequence of operations for the computer and/or computing system of FIG. 1, 2, or 3 and illustrating inputs from the computer and/or computing system of FIG. 1, 2, or 3 to analyze computing nodes of the computing system, adjust identifiers associated with the analyzed computing nodes, and selectively add analyzed computing nodes to a virtual system pool.

FIG. 16 is a block diagram 440 illustrating a sequence of operations that may be executed by a parallel processing computing system and illustrating inputs from the computing system to analyze computing nodes of the computing system, adjust identifiers associated with the analyzed computing nodes, and selectively add analyzed computing nodes to a virtual system pool consistent with embodiments of the invention. The computing system selects a computing node of the computing system to analyze (block 442). Selection of a computing node to be analyzed may be dynamically determined by the computing system or by manual selection of a user.

In some embodiments, the computing system may select a computing node already associated with a virtual system pool to analyze, where it is desired that a second virtual system pool including a subset of computing nodes assigned to the first virtual system pool be created. These embodiments may be useful, if for example, the computing system determined that one or more assigned tasks require a hardware resource configuration. If a first virtual system pool has been previously created that includes computing nodes meeting some but not all hardware resource requirements for the assigned tasks, the computing system may analyze computing nodes in the first virtual system pool to determine computing nodes that meet the required hardware resource requirements. For example, if a computing system determined that tasks assigned from the workload require computing nodes having redundant processing units, memory blocks, and I/O storage interfaces, and a first virtual system pool included computing nodes having redundant processing units and memory blocks, the computing system may analyze the computing nodes of the first virtual system pool to identify computing nodes also having redundant I/O storage interfaces to assign to a second virtual system pool. Hence, in this example, the computing system determined that the requirements of the first virtual system pool were a subset of the requirements for the assigned tasks, the computing system analyzed the computing nodes in the first virtual system pool to identify the computing nodes also having redundant I/O storage interfaces to generate a second virtual system pool. In this embodiment, the computing system dynamically selected computing nodes in the computing system to analyze, and the computing system saved resources by only analyzing the computing nodes for redundant I/O storage interfaces. In some embodiments, an administrator may select one or more computing nodes to be analyzed by the computing system. For example, computing nodes may be added to an already existing computing system, and the administrator may select the newly added computing nodes to be analyzed by the computing system and assigned one or more virtual system pools in the system.

The computing system utilizes the stored domain knowledge data 444 and the system hardware data 446 to analyze the hardware resources configured on the computing node (block 448). Utilizing the stored domain knowledge data 444 and the stored system hardware data 446, the computing system may analyze the hardware resources for redundancy and/or availability. The computing system determines whether the analyzed computing node is configured with one or more redundant and/or available resources (block 450). If the analyzed computing node is configured with one or more redundant and/or available resources, the computing system adjusts the one or more identifiers associated with the analyzed computing node for each type of redundant and/or available hardware resource (block 452). The computing system determines whether the analyzed computing node meets the requirements of the virtual system pool (block 454). As described herein, the requirements of the virtual system pool may vary. The virtual system pool may require a computing node to be redundant with respect to one or more target types of hardware resources. The virtual system pool may require a computing node to not only be redundant with respect to one or more target types of hardware resources but also to a defined degree (i.e., the computing node must have a desired number of a desired type of hardware resource redundantly configured thereon). In addition, the virtual system pool may require only a computing node to be redundant with a certain number of different types of hardware resources. Assignment to a virtual system pool may also require a computing node to be available. If the analyzed computing node meets the requirements of the virtual system pool, the computing system adds the analyzed computing node to the virtual system pool (block 456). If, however, the analyzed computing node does not have redundant and/or available resources configured thereon, or if the analyzed computing node does not meet the requirements of the virtual system pool, the computing system does not add the computing node to the virtual system pool (block 458).

While in the previous examples, analysis of a computing node regarding redundancy and availability characteristics were performed substantially in parallel, those skilled in the art will recognize that the two characteristics may be analyzed separately. For example, given a first virtual system pool indicating redundancy with regard to one or more types of hardware resources, an analysis of the computing nodes associated with the first virtual system pool may be performed to selectively assign computing nodes of the first virtual system pool to a second virtual system pool, where the second virtual system pool may indicate high availability. Hence, in this example, computing nodes that had already been associated with a first virtual system pool, indicating redundancy with regard to one or more types of hardware resources (i.e., resiliency), may be further analyzed to determine which of the computing nodes were also highly available.

In addition, while assignment of analyzed computing nodes has been discussed with respect to one virtual system pool, assignment to one or more virtual system pools substantially in parallel may be performed. In these embodiments, the computing system determines whether the analyzed computing nodes meet the requirements for one or more virtual system pools (block 454). In these embodiments, an analyzed computing node may be assigned to more than one virtual system pool based on the requirements of the virtual system pools.

Furthermore, the computing system may analyze a computing node to determine redundancy of available hardware resources configured on the computing node. In some embodiments, the computing system may therefore determine whether the computing system has available redundant hardware resources. For example, with reference to the computing system of FIG. 3, the system hardware data may indicate that computing node 40 comprised eight processing units 48, and in this example, if the domain knowledge data indicates that six processing units 48 were required by the computing node 40, and two processing units 48 were available, the computing system would adjust the identifier associated with computing node 40 to indicate that computing node 40 has available, redundant processing units 48. In contrast, with regard to computing node 46 the system hardware data would indicate that computing node 46 comprised eight processing units 76, and in this example, if the domain knowledge data indicates that seven processing 76 units were required by the computing node 46, and one processing unit 76 was available, the computing system would not adjust the identifier associated with the computing node 46, because computing node 46 would only have one available processing unit 76, and therefore would not have redundant available processing units.

Moreover, in other embodiments, the computing system analyzes a computing node to determine not only whether the computing node is redundant with regard to a type of hardware resource, but also to what degree. In these embodiments, adjustment of the associated identifier may differ depending on the number of a type of hardware resource redundantly configured on the computing node. Hence, for example, referring to FIG. 3, the system hardware data would indicate that computing node 40 comprised eight processing units 48 and the domain knowledge data would indicate that six processing units 48 were required by the computing node 40, the identifier associated with computing node 40 would be adjusted to reflect that computing node 40 included two redundant processing units. In contrast, in this example, if computing node 42 comprised eight processing units 58 and four processing units 58 were required by the computing node 42, the identifier associated with computing node 42 would be adjusted to reflect that computing node 42 included four redundant processing units 58. In this example, the identifiers associated with computing node 40 and 42 would differ, and the identifier associated with computing node 40 would indicate that computing node 40 was less resilient than computing node 42 with respect to processing units because computing node 40 comprised less redundant processing unit than computing node 42.

In some embodiments, the number of redundant hardware resources of a desired type may be combined with availability of a computing node to form a high resiliency virtual system pool that identifies computing nodes that are redundant with respect to one or more different types of hardware resources and highly available to perform tasks. Hence, in this example a computing node is assigned to a high resiliency virtual system pool only when the computing node comprises redundant processing units, cooling components, power supply units/or capacity, I/O interfaces, and/or storage blocks, and the hardware resources on the computing node are highly available to perform tasks. Furthermore the associated identifier of each computing node may be adjusted to reflect the number of types of hardware resources that are redundant on the node, the extent to which each hardware resource was redundant on a given computing node, and the availability of the hardware resources on given computing node. Hence, in these embodiments, based on this classification, the invention may enable selective assignment of tasks by the distributed application to highly available computing nodes with redundant hardware resources.

While all of the invention has been illustrated by a description of various embodiments and while these embodiments have been described in considerable detail, the applicant does not intend to restrict or in any way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention. Those skilled in the art will recognize that parallel processing computing systems generally divide a workload into a plurality of tasks that may be performed substantially in parallel. Hence, while the disclosures and drawings are discussed in a serial manner, the computing system may analyze a computing node for all redundant hardware resources substantially in parallel; moreover, the computing systems may analyze a plurality of computing nodes in the computing system substantially in parallel.

As provided herein, embodiments of the invention may be used by the distributed application to more efficiently assign tasks within the computing system. Furthermore, embodiments of the invention provide a method, system, and program code product that is configured to dynamically analyze various hardware resources configured on a plurality of computing nodes. This information may be used to inform a user of the computing system regarding the status of hardware resources in the computing system. In addition, in some embodiments the computing system may dynamically maintain assignment to a virtual system pool in response to the occurrence of events in the computing system. For example, a computing node may be removed from a virtual system pool if a hardware resource failure occurs, a computing node may be added to a virtual system pool if a hardware resource becomes available after completion of a task, a computing node may be removed from a virtual system pool in response to the computing system assigning the computing node a task, etc.

In some embodiments, the invention may be used to increase resiliency in various computing nodes from the plurality of computing nodes in the system. If a first computing node were configured with redundancy across all possible hardware resources with the exception of power supply units, embodiments of the invention may surface this information to the user, and the user may utilize this information to add a power supply unit to the first computing node to make the first computing node fully redundant with respect to all types of hardware resources, which may make the first computing node highly resilient. Embodiments of the invention may use the identifier associated with the first computing node to determine which types of hardware resources are not redundant on a first computing node, and bring this lack of redundancy to the attention of the user of the computing system. In these embodiments, the invention allows a user of the computing system to focus hardware resource upgrades to efficiently increase the resiliency of computing nodes in the computing system.

In addition, the automated classification of the computing nodes provides for the further automation of workload placement and automation of other expert systems that may act on the classification information, such as a system health monitor. In some embodiments, the invention may be used to monitor hardware resource events in the computing system. For example, the dynamic analysis of a first computing node in the computing system may cause an identifier to be adjusted for the first computing node. The adjustment of the identifier may be used by some embodiments of the invention to notify a user of the computing system of a hardware resource event (i.e., a hardware resource failure, a hardware resource upgrade, a connection failure, etc.) in the first computing node. For example, if a hardware resource configured on the first computing node fails, the identifier associated with the first computing node may be adjusted. The adjustment of the identifier in the first computing node may be used to alert the user of the computing system regarding the hardware resource failure in the first computing node. Similarly, if a hardware resource were added to a first computing node, the adjustment of the associated identifier may be used to alert a user of the system as to the addition. In sum, embodiments consistent with the invention may be used to assist in monitoring the occurrence of events in the computing system. Moreover, the invention is flexible enough to be extended to various types of computing systems and various types of hardware resources as well to encompass additional hardware resources that require resiliency.

While the invention has been illustrated by a description of the various embodiments and the examples, and while these embodiments have been described in considerable detail, it is not the intention of the applicants to restrict or in any other way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method of building a high resiliency virtual system pool in a computing system of the type that includes a plurality of nodes, the method comprising:

analyzing, with at least one processor of the computing system, a plurality of types of hardware resources for a first node among the plurality of nodes to identify for which of the plurality of types of hardware resources the first node has redundant hardware resources configured thereon, including adjusting an identifier associated with the first node for each type of hardware resource on the first node that has redundant hardware resources; and selectively assigning, with the at least one processor, the first node to a high resiliency virtual system pool based upon the identified types of hardware resources for which the first node has redundant hardware resources configured thereon.

2. The method of claim 1, wherein one type of hardware resource is an I/O interface and adjusting the identifier includes:

adjusting the identifier when the first node includes at least two I/O interface connected to an external resource.

3. The method of claim 2, wherein each I/O interface is a storage interface.

4. The method of claim 2, wherein each I/O interface is a network interface.

5. The method of claim 2, wherein the external resource includes at least one of a storage module, a storage area network, a wide area network, and a local area network.

6. The method of claim 1, wherein one type of hardware resource is a power supply and adjusting the identifier includes:

adjusting the identifier when the first node includes at least one redundant power supply.

7. The method of claim 1, wherein one type of hardware resource is a power supply and adjusting the identifier includes:

adjusting the identifier when the first node includes excess power supply capacity above a target threshold.

8. The method of claim 1, wherein one type of hardware resource is a processing unit and adjusting the identifier includes:

adjusting the identifier when the first node includes at least two redundant processing units.

9. The method of claim 1, wherein one type of hardware resource is a cooling component and adjusting the identifier includes:

adjusting the identifier when the first node includes at least one redundant cooling component.

10. The method of claim 9, wherein the cooling component is a fan.

11. The method of claim 1, wherein one type of hardware resource is a block of memory and adjusting the identifier includes:
adjusting the identifier when the first node includes at least two redundant blocks of memory.

12. The method of claim 1, wherein selectively assigning the first node to the high resiliency virtual system pool includes:
selectively assigning the first node to the high resiliency virtual system pool when the first node is associated with a redundant hardware resource matching a target type of hardware resource in turn associated with the high resiliency virtual system pool.

13. The method of claim 1, wherein the high resiliency virtual system pool indicates high availability environments in which to perform a task.

14. The method of claim 1, further comprising:
selecting, from the high resiliency virtual system pool, the first node to perform a task.

15. The method of claim 14, the identifier of the first node indicating the highest availability environment from among respective identifiers of a subset of the plurality of nodes selectively assigned to the high resiliency virtual system pool.

16. The method of claim 1, wherein adjusting the identifier includes:
incrementing a counter associated with the first node for each type of hardware resource on the first node that has redundant hardware resources.

17. The method of claim 16, wherein selectively assigning the first node to the high resiliency virtual system pool includes:
selectively assigning the first node to the high resiliency virtual system pool when the counter exceeds a target value.

18. The method of claim 1, wherein adjusting the identifier includes:
selectively setting a flag for each type of hardware resource on the first node that has redundant hardware resources.

19. The method of claim 18, further comprising:
incrementing a counter for each set flag.

20. The method of claim 18, wherein selectively assigning the first node to the high resiliency virtual system pool includes:
selectively assigning the first node to the high resiliency virtual system pool when the counter exceeds a target value.

21. A computing system, comprising:
a plurality of nodes, each node including a plurality of hardware resources;
program code configured to be executed by the computing system, the program code further configured to analyze the plurality of hardware resources for a first node among the plurality of nodes to identify for which of the plurality of types of hardware resources the first node has redundant hardware resources configured thereon, including adjusting an identifier associated with the first node for each type of hardware resource on the first node that has redundant hardware resources; and selectively assign the first node to a high resiliency virtual system pool based upon the identified types of hardware resources for which the first node has redundant hardware resources configured thereon.

22. A program product, comprising:
program code configured upon execution to analyze a plurality of hardware resources of a plurality of nodes for a first node among the plurality of nodes to identify for which of the plurality of types of hardware resources the first node has redundant hardware resources configured thereon, including adjusting an identifier associated with the first node for each type of hardware resource on the first node that has redundant hardware resources; and selectively assign the first node to a high resiliency virtual system pool based upon the identified types of hardware resources for which the first node has redundant hardware resources configured thereon; and
a non-transitory computer readable device storing the program code.

* * * * *